Feb. 21, 1928. 1,659,600
J. GLUCK
ILLUMINATED SIGNAL MEANS FOR TAXIMETERS
Filed Jan. 30, 1923 3 Sheets-Sheet 1

Witnesses:—
Chas. L. Griesbauer
Emory Groff

Inventor
Julius Gluck,
By D. P. Wolhaupter
Attorney

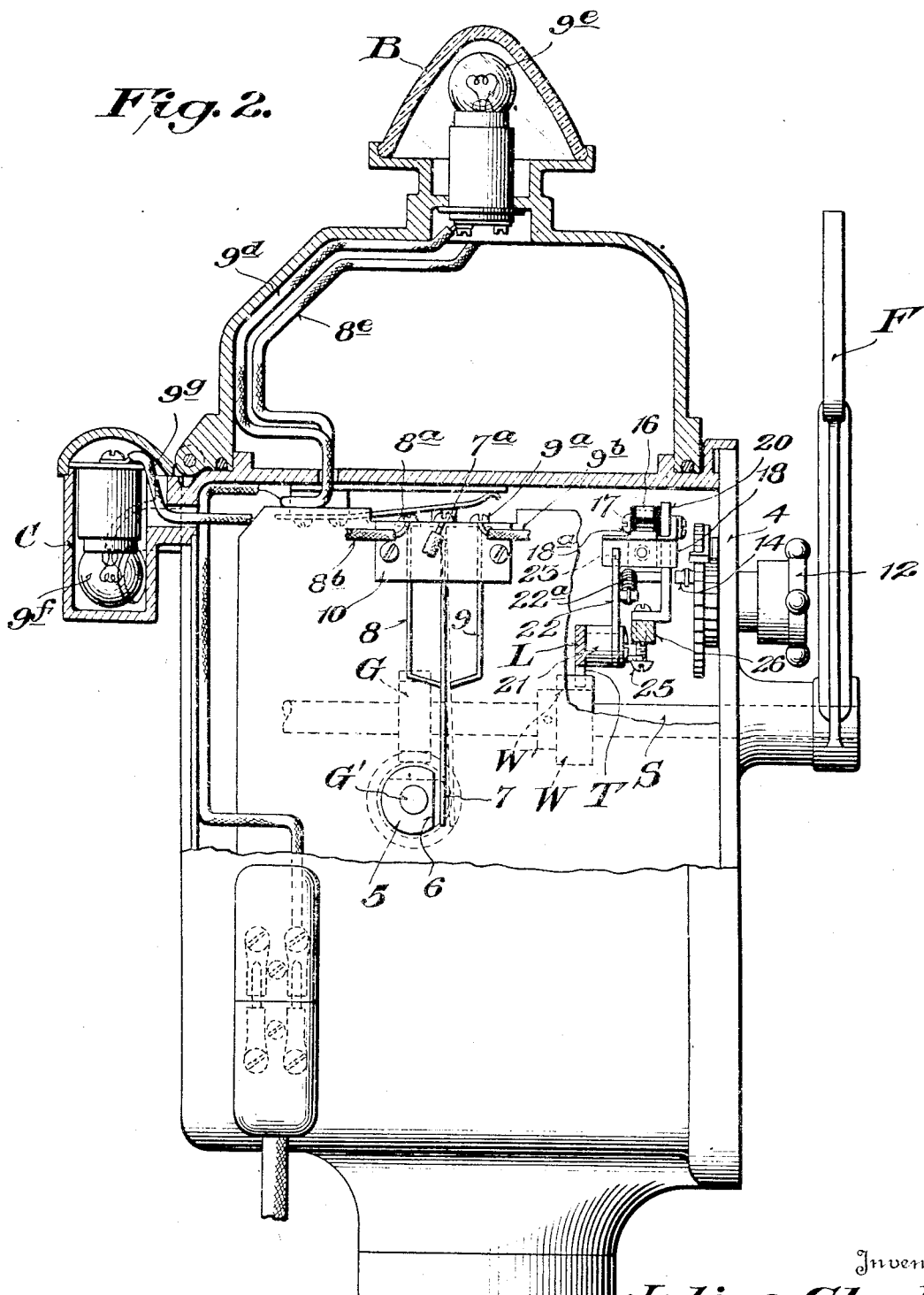

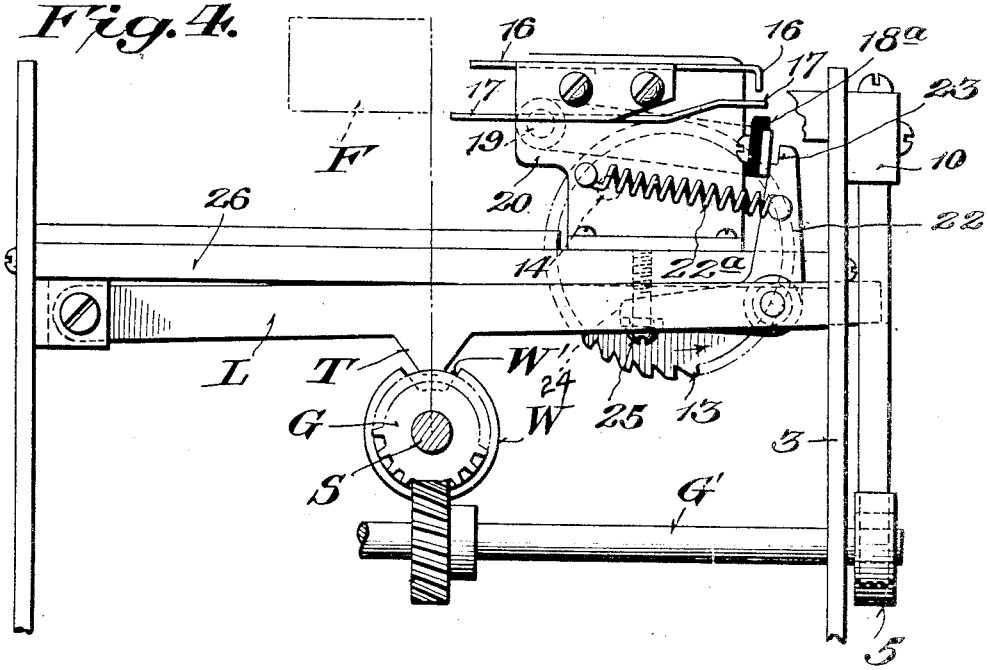
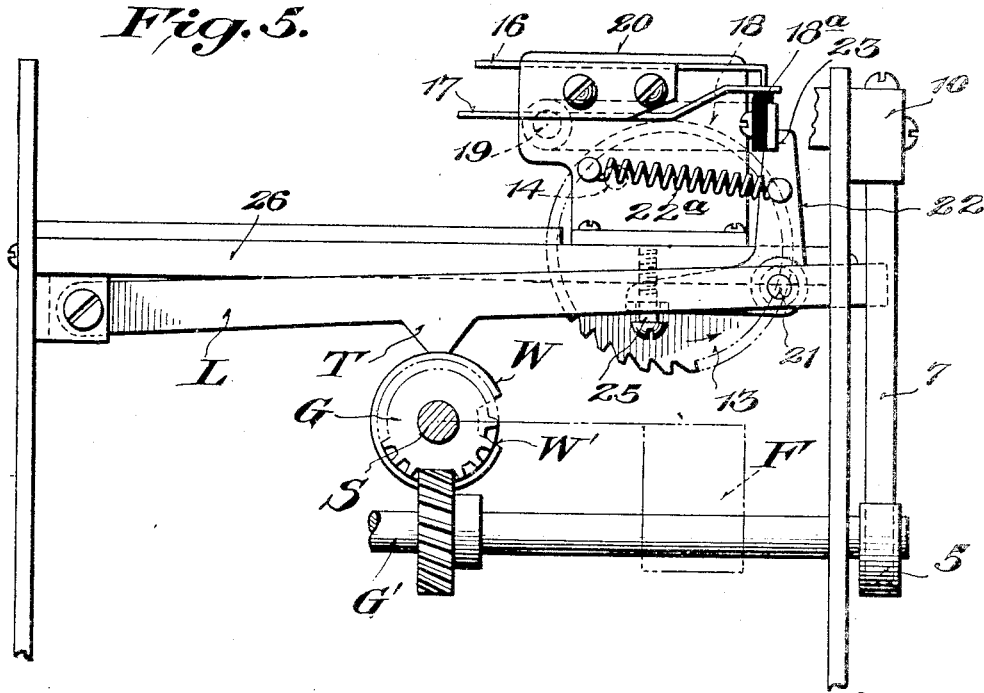

Patented Feb. 21, 1928.

1,659,600

UNITED STATES PATENT OFFICE.

JULIUS GLUCK, OF NEW YORK, N. Y., ASSIGNOR, BY MESNE ASSIGNMENTS, TO OHMER FARE REGISTER COMPANY, OF DAYTON, OHIO, A CORPORATION OF NEW YORK.

ILLUMINATED SIGNAL MEANS FOR TAXIMETERS.

Application filed January 30, 1923. Serial No. 615,902.

This invention relates to taximeters and more particularly to a signaling system for announcing the status of the meter.

To that end, the invention contemplates a novel arrangement of illuminating instrumentalities which may be automatically controlled by the operation of the flag shaft or equivalent part of the meter, and which cannot be tampered with by the operator of the vehicle.

A primary object of the invention is to provide a combination of lights which will not only announce that the vehicle is occupied, but will also show when "extras" have been registered on the face of the meter. Heretofore it has been almost impossible for spotters employed by the taxicab company to determine whether or not the flag was properly placed in a tariff position when the cab contained passengers, and furthermore there has been no means whatever of showing at a distance whether or not the "extras" had been registered. Therefore, the present invention contemplates a visual signaling system which will display a red light when the flag is in its vertical or vacant position, showing that the cab is unoccupied, and a green light when the cab is occupied and earning a fare, the red light being automatically extinguished when the flag is turned from the vacant position into one of the tariff positions, unless the fare includes "extras", in which case both the green and red lights will be illuminated to show that the cab is earning and that extras have been registered on the face of the meter.

A further object of the invention is to provide simple, practical and reliable means for completing the circuits to the illuminating lamps, the arrangement of the contacts and instrumentalities for closing the circuits being so arranged and disposed as not to interfere with the meter-operating and fare registering instrumentalities.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:—

Figure 2 is a vertical sectional view, partly in elevation of the meter illustrating the main contacts and the manner in which they are operated.

Figure 4 is a detail view illustrating the contacts for the "extras" unit.

Figure 5 is a view similar to Figure 4 showing the contacts in the latter figure in closed position.

Similar reference characters designate corresponding parts throughout the several figures of the drawings.

Figure 1:
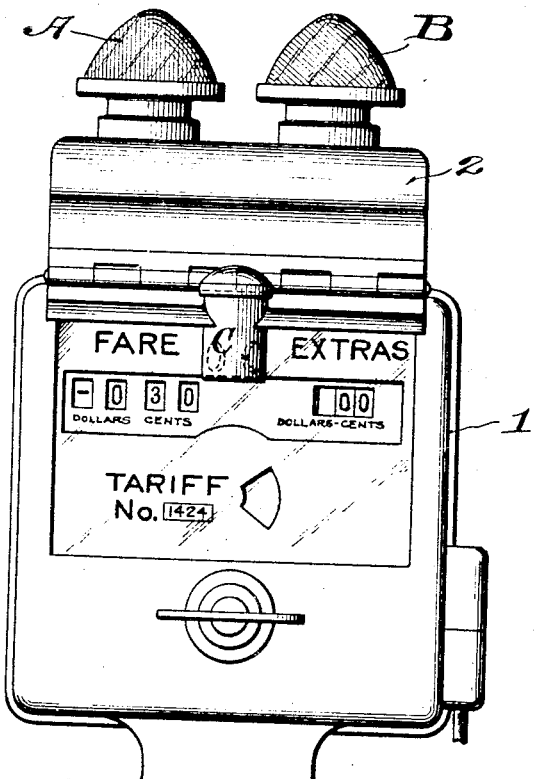
Figure 1 is a front elevation of a meter equipped with the present illuminating system.

In carrying the invention into effect it is proposed to provide the meter casing designated generally as 1 and having the top casing 2 with the illuminating units A, B and C, the units A and B being respectively red and green and located preferably on the upper part of the casing 2, while the unit C is preferably arranged in such a manner as to flood the face of the meter with white light. Within the main casing 1 there is inserted the usual meter frame 3 having the back plate 4 which provides one of the supports for the flag shaft S which carries the usual flag F in an exposed position. The said flag shaft S is provided with the usual gear G for operating the cam shaft G', and is also provided with the cam W having the notch W' for receiving the depending tongue T of the pivoted lever L, all of which parts are of the type shown in my copending application Serial No. 515,920 filed November 17, 1921.

The cam shaft G' which is directly controlled by the flag F carries therewith a disk 5 having a flat face 6, which, as shown in Figure 2, is normally parallel to the contact arm 7 when the flag F is in its vertical or vacant position. However, when the flag F is turned 90° or more into one of the tariff positions the cam shaft G' will be rotated and thus cause the circular part of the disk 5 to shift the contact arm 7 from the full line position shown in Figure 2 to the dotted line position.

When the flag is in the vacant or upright position as shown in Figure 2 the contact arm 7 engages with the contact finger 8 and thus closes the circuit to the red lamp A to indicate that the vehicle is for hire, and on the other hand, when the flag is lowered into one of the tariff positions the arm 7 is shifted into engagement with the contact finger 9 thereby breaking the circuit to the red signal lamp A and completing the circuit to the green lamp B to indicate that the vehicle is hired and also closing the circuit to the illuminating unit C on the front of the meter so that the passenger can see plainly the amount of fare registered. It will therefore be understood that the illuminating unit C is included in the same circuit with the signal unit B.

With reference to the manner in which the circuits may be completed to the units A and B—C it will be observed that in the present embodiment the contact arm 7 is held in an insulated block 10 which also carries the spaced contact fingers 8 and 9. The contact finger 8 is electrically connected by screw $8^a$, wire $8^b$, and wire $8^c$ to the contact member $8^d$ carried on an insulating block 11 mounted on the meter frame 3.

Figure 3:
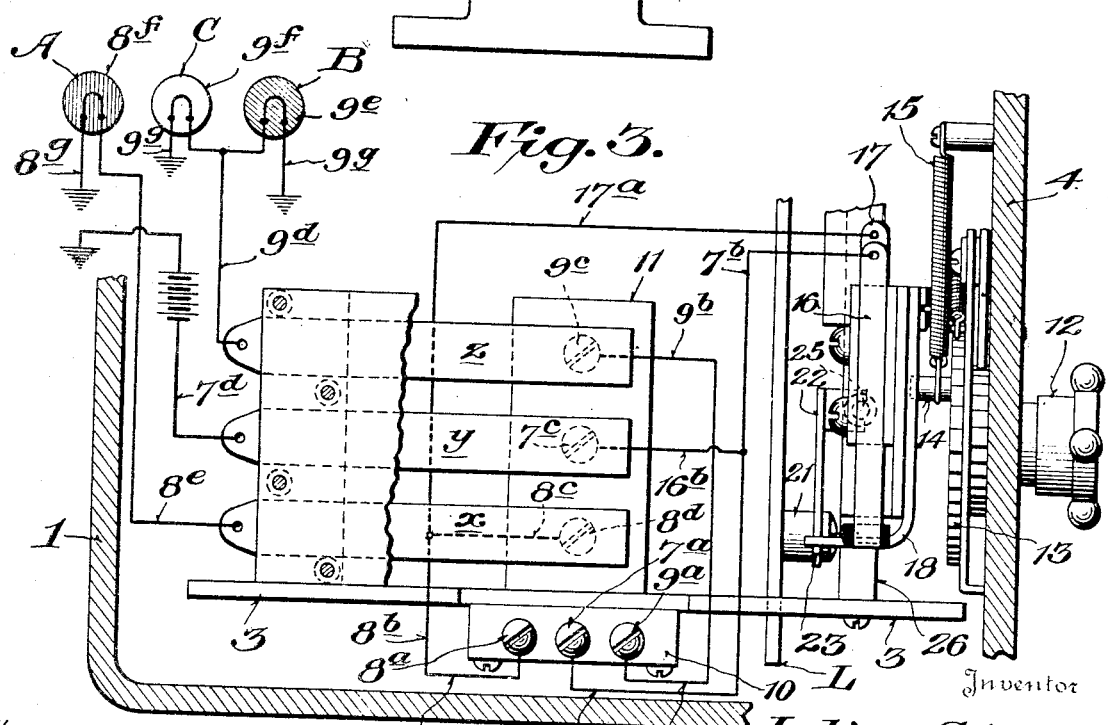
Figure 3 is a top plan view of the interior meter mechanism, having the electrical circuits shown in diagram thereon.

As will be observed from Figures 2 and 3, for the purpose of facilitating the insertion and removal of the meter frame 3 within the main casing 1, the inside upper part of the meter casing carries a plurality of spring contact terminal fingers $x$, $y$ and $z$ which are adapted to detachably engage with the contacts on the insulating block 11. The said contact finger $x$ is electrically connected with the lamp of the red signal unit A by the wire $8^e$, and the lamp $8^f$ is grounded to the meter frame as indicated at $8^g$.

The contact arm 7 is electrically connected with screws $7^a$, and by wire $7^b$, to the contact $7^c$ on the insulating block 11, and through the spring finger $y$ receives current from a battery or other suitable source over the wire $7^d$. Therefore, when the contact arm 7 engages with the contact finger 8 it will readily be seen that the circuit will be completed to the red lamp $8^f$ from the source of electrical energy through the connections described.

The contact finger 9 is electrically connected by the screw $9^a$ to the wire $9^b$ which is in turn connected to the contact $9^c$ on the block 11. Since the finger $z$ engages with the contact $9^c$, the circuit may be completed to the green unit B and white unit C by means of the wire $9^d$, the lamps $9^e$ and $9^f$ respectively of said units being grounded as at $9^g$. Thus, when the arm 7 is forced into contact with the finger 9 the circuit will be simultaneously completed to the green unit B and white unit C while the red unit A will be extinguished.

However, as previously indicated, it is one of the distinctive features of the present invention to provide some way for indicating visually the registration of "extras" on the face of the meter, and to that end the "extras" operating means of the meter is provided with a switch for closing the circuit to the red signal unit A while the circuit to the units B and C is still closed. In that way, when all units are in operation the inspector can readily tell at a glance that the cab is occupied and that extras have been registered on the face of the meter.

Referring now more particularly to Figures 3, 4 and 5 it will be observed that the extras operating knob 12 has associated therewith a disk 13 for operating the lever which actuates the extras fare drum in the usual manner. This disk 13 is provided with an offset pin 14 which has a spring 15 connected thereto so as to rotate the disk 13 with a quick impulse to properly operate the lever for the extras drum. This unit is also shown in detail in my co-pending application Serial No. 515,920, filed November 17, 1921. The said pin 14 is intended to operate an "extras" switch unit which preferably consists of a bracket including an insulated block carrying a pair of spring contact members 16 and 17, the latter being moved by a lever 18 which is pivoted as at 19 upon a suitable bracket 20 carried by a portion of the meter frame. To prevent short circuiting the end of the lever 18 is provided with a hard fibre tip member $18^a$ for engaging directly with the contact 17.

When the flag is in its vertical or vacant position, the parts of the extras switch unit assume the position shown in Figure 4, in which the contacts 16 and 17 are shown separated and the lever 18 is in its lowermost position. The meter construction is such that when the flag is in the vacant position the extras knob cannot be turned, but as soon as the flag is put in a tariff position the extras knob may be manipulated and the extra charges registered, providing, of course, the passenger is chargeable with fees other than carriage such for example, as trunks, or other luggage.

The lever L which is a part of the meter mechanism controlled by the cam W has pivoted thereto as at 21 a detent which may be a bell crank lever 22, the upper end of which is provided with a shoulder 23 while the end 24 of the other arm is adapted to engage with an adjustable screw or other abutment 25 secured to one of the meter cross-rods 26 so that when the lever L drops and carries therewith the bell crank 22 the end 24 of the bell crank will engage the screw 25 thereby to insure its being rocked to a position where the shoulder 23 will clear the end of the lever 18 and permit the latter to fall, as clearly shown in Figure 4. For the purpose of tensioning the bell crank 22 a spring $22^a$ may connect one arm of the bell crank with the bracket that supports the switch, as shown.

When the flag F is placed in one of the tariff positions, indicated for example in Figure 5, the cam W is rotated to lift the tongue T out of the notch W'. As the bell crank 22 is carried with the lever L it will be moved upwardly and the side edge of the bell crank will be yieldingly held against the end of the lever 18 due to the tension of the spring 22ª, and when the extras knob 12 is rotated to in turn rotate the disk 13, the pin 14 on the disk will (near the end of its cycle) engage beneath the lower edge of the lever 18 and lift or raise it, whereupon the shoulder 23 will snap into supporting position, and thereby hold both of the contacts 16 and 17 together. Thus, when the extras knob is operated one turn the lever 18 will be lifted onto the shoulder 23 and held there until the entire meter mechanism is reset through the manipulation of the flag F, and the consequent rotation of the flag shaft S. When the meter is reset the lever L is lowered and as the bell crank 22 is carried with the lever it will be apparent that the bell crank will also be lowered and permit the lever 18 to thus separate the contacts 16 and 17.

The effect of closing the contacts 16 and 17 by the manipulation of the extras knob 12 is to close the circuit to the red illuminating unit A while the green and white units B and C are still glowing. This may be readily accomplished through the wiring connections provided for the contacts 16 and 17. That is to say, the contact 16 is connected with the battery finger y through the line 16ᵇ and 7ᵇ, while the contact 17 is connected to the finger x by the wire 17ª. After the circuit is closed over these connections it is completed to the red lamp 8ᶠ of the unit A through the previously described connections from the finger x.

With the above arrangement it will be seen that when the extras operating means is actuated by the chauffeur, the red unit A may be illuminated independently of the contact arm 7 and contact finger 8, thereby to produce a combination announcement or signal for readily indicating that the cab is occupied and that extras have been rung up on the face of the meter.

Without further description it is thought that the many features and advantages of the invention will be readily apparent. However, in summarizing the invention it is pointed out that the same essentially involves a plurality of signal units mounted directly on the meter casing in such a way that none of the wiring connections or lamps may be tampered with by the driver, said signaling units consisting of lamps or illuminated globes of contrasting color to provide the desired signal indications. In that connection it is pointed out that the signal lamps are controlled during the cycle of the flag or equivalent part in such a way that the units, namely the red light or the green and white light together may be caused to glow at different periods, or simultaneously, according to the indication to be given.

I claim:—

1. An electrical signaling system for taximeters including the combination with a plurality of manually operated meter control devices, of a plurality of visual signal units adapted to be successively illuminated and darkened by the movement of one of said control devices, and means adapted to be operated by the other of said control devices for causing the darkened unit to glow.

2. An electrical signaling system for taximeters including the combination with a plurality of manually operated meter control devices, of a plurality of visual signal units, one of which includes a meter-face illuminating lamp; said units being adapted to be successively illuminated and darkened by the movement of one of said control devices and means adapted to be operated by the other of said control devices for causing the darkened unit to glow.

3. An electrical signaling system for taximeters including the combination with a flag and an extras mechanism, of a plurality of visual signal units adapted to be successively illuminated and darkened by the movement of said flag, and means operated by the extras mechanism for causing both units to glow simultaneously.

4. An electrical signaling system for taximeters including the combination with the flag and extras mechanism, of a pair of visual signaling units of contrasting color mounted on the meter casing said units adapted to be successively illuminated and darkened by the movement of the flag, and a switch adapted to be operated by the extras mechanism for causing the darkened unit to glow simultaneously with the illuminated unit when "extras" have been registered on the face of the meter.

5. A signaling system for taximeters including the combination with the flag and flag shaft operated thereby, and the extras mechanism, of a plurality of visual signal units mounted on the meter casing, a main switch unit controlled by said flag and shaft operated thereby for causing said units to successively glow, and a switch device operated by the extras mechanism of the meter for causing the dark unit of the system to glow while the other remains illuminated.

6. A signaling system for taximeters including the combination with the flag and flag shaft operated thereby and the extras mechanism of a plurality of visual signal units mounted on the meter casing, a main switch device controlled by the flag operated shaft for successively operating said units, a second switch device adapted to be operated by said extras mechanism, and electrical connections between said second switch device and one of said units whereby the same may be caused to glow when the flag is in a tariff position.

7. A signaling system for taximeters including the combination with the flag and flag shaft operated thereby and the extras mechanism of a plurality of visual signal units mounted on the meter casing, a main switch device controlled by the said shaft for successively operating said units, a second switch device adapted to be operated by said extras mechanism, and electrical connections between said second switch device and one of said units whereby the same may be caused to glow when the flag is in a tariff position, and means controlled by the flag operated shaft for maintaining the second switch device closed until the meter mechanism is reset.

8. A signaling system for taximeters including the combination with the flag and flag shaft operated thereby and the extras mechanism of a plurality of visual signal units mounted on the meter casing and an illuminating unit included in circuit with one of said signal units and arranged to flood the face of the meter with white light, a main switch device controlled by the said shaft of the meter for operating one of said signal units alone and subsequently operating the other of the signal units and the illuminating unit simultaneously when the first mentioned unit is dark, a second switch device adapted to be operated by said extras mechanism and electrically connected with the one of said signal units which is dark when the flag is in a tariff position, and means controlled by the flag operated shaft for maintaining the second switch device closed until the meter mechanism is reset.

9. A signaling system for taximeters including the combination with the flag and flag shaft operated thereby and the extras mechanism of a plurality of visual signal units mounted on the meter casing and an illuminating unit included in circuit with one of said signal units and arranged to flood the face of the meter with white light, a main switch device controlled by the said shaft of the meter for operating one of said signal units alone and subsequently operating the other of the signal units and the illuminating unit simultaneously when the first mentioned unit is dark, a second switch device adapted to be operated by said extras mechanism and electrically connected with the one of said signal units which is dark when the flag is in a tariff position, and means controlled by the flag shaft for maintaining the second switch device closed until the meter mechanism is reset, said means comprising a lever for closing the switch and a spring tensioned detent carried by a part of the meter moved by the flag shaft.

10. A signaling system for taximeters including the combination with the flag and flag shaft operated thereby and the extras mechanism of a pair of visual signaling units mounted on the meter casing, a single switch device electrically connected with said visual signaling units, and means controlled by said flag operated shaft of the meter for operating said single switch device whereby one unit will glow when the flag is in vacant position and will be automatically extinguished when the flag is moved into a tariff position, the operation of said switch device by the movement of the flag to said tariff position causing the other signal unit to glow, and means for causing the other of said signaling units to glow while the first unit is still glowing.

11. A signaling system for taximeters including the combination with the flag and flag shaft operated thereby and the extras mechanism of a pair of electrical signaling units of contrasting color mounted on the meter casing, and an electrical illuminating unit included in circuit with one of said units and arranged to flood the face of the meter with white light, means controlled by said flag operated shaft of the meter for causing said signal units alternately to glow, and means for causing the darkened unit to glow simultaneously with the lighted unit.

12. A signaling system for taximeters including the combination with the flag and flag shaft operated thereby and the extras mechanism of a pair of electrical signaling units of contrasting color mounted on the meter casing, and an electrical illuminating unit included in circuit with one of said units and arranged to flood the face of the meter with white light, means controlled by said flag operated shaft of the meter for causing said signal units alternately to glow, and means controlled by the extras mechanism of the meter to cause the darkened one of said signal units to glow simultaneously with the lighted unit when the flag is in a tariff position.

In testimony whereof I hereunto affix my signature.

JULIUS GLUCK.